US008635999B2

(12) United States Patent
Rosene et al.

(10) Patent No.: US 8,635,999 B2
(45) Date of Patent: Jan. 28, 2014

(54) FLOATING SPA COVER OR ADJUSTABLE SIZE

(76) Inventors: Richard C Rosene, Murrieta, CA (US); David J. Bartoli, Murrieta, CA (US)

( * ) Notice: Subject to any disclaimer, the term of this patent is extended or adjusted under 35 U.S.C. 154(b) by 838 days.

(21) Appl. No.: 12/290,295

(22) Filed: Oct. 28, 2008

(65) Prior Publication Data

US 2009/0056008 A1    Mar. 5, 2009

Related U.S. Application Data

(63) Continuation-in-part of application No. 11/400,268, filed on Apr. 7, 2006, now Pat. No. 7,603,727.

(51) Int. Cl.
*F24J 2/42* (2006.01)

(52) U.S. Cl.
USPC ........... 126/565; 126/561; 126/564; 126/566; 126/568; 441/40

(58) Field of Classification Search
USPC ............................................. 126/565; 441/40
See application file for complete search history.

(56) References Cited

U.S. PATENT DOCUMENTS

| | | | | | |
|---|---|---|---|---|---|
| 1,154,776 | A | * | 9/1915 | Joseph | 5/723 |
| 2,023,314 | A | * | 12/1935 | Doron | 441/111 |
| 2,415,150 | A | * | 2/1947 | Russell | 5/710 |
| 2,586,031 | A | * | 2/1952 | Hahne | 5/485 |
| 2,715,231 | A | * | 8/1955 | Marston | 441/127 |
| 2,752,616 | A | * | 7/1956 | Coates et al. | 441/40 |
| 3,122,985 | A | * | 3/1964 | Osborne | 52/2.17 |
| 3,128,689 | A | * | 4/1964 | Binsfeld | 454/203 |
| 3,249,682 | A | * | 5/1966 | Laing | 174/384 |
| 3,274,624 | A | * | 9/1966 | Noerdinger | 5/710 |
| 3,428,974 | A | * | 2/1969 | Stuart | 5/710 |
| 3,533,110 | A | * | 10/1970 | Gisondi | 4/499 |
| 3,813,716 | A | * | 6/1974 | Francis | 5/710 |
| 3,973,363 | A | * | 8/1976 | LaPorte et al. | 52/2.19 |
| 4,009,675 | A | * | 3/1977 | Zollner et al. | 114/267 |
| 4,033,326 | A | | 7/1977 | Leitner | |
| 4,040,210 | A | * | 8/1977 | Land | 52/2.12 |
| 4,054,961 | A | * | 10/1977 | Tangen | 441/39 |
| 4,122,561 | A | * | 10/1978 | Barr | 4/499 |
| 4,146,015 | A | | 3/1979 | Acker | |
| 4,155,323 | A | * | 5/1979 | Finsterwalder | 114/264 |
| 4,189,058 | A | * | 2/1980 | Seliskar et al. | 220/218 |

(Continued)

OTHER PUBLICATIONS

U.S. Appl. No. 11/507,918, Rosene.

(Continued)

*Primary Examiner* — Kenneth Rinehart
*Assistant Examiner* — Jorge Pereiro
(74) *Attorney, Agent, or Firm* — Martino Patent Law

(57) ABSTRACT

An insulating cover for floating on liquid, such as in a spa, has an area for covering an area of the surface of the liquid. The cover generally comprises a first rectangle for covering a first area and a plurality of successive rectangular tubes connected to either the first rectangle or to a larger rectangle formed by the addition of a prior successive tube so as to form another rectangle for covering additional area. The amount of coverage area can be adjusted by selectively detaching tubes, such as by cutting them off, and by changing the amount of inflation of tubes such that the cover is adaptable to spas of different sizes. In an exemplary embodiment, tubes adjust both the width and length of the cover, and the cover is adapted for folding substantially in half when inflated.

22 Claims, 3 Drawing Sheets

FIG. 2

(56) References Cited

U.S. PATENT DOCUMENTS

| | | | |
|---|---|---|---|
| D258,463 S * | 3/1981 | Emmer | D25/2 |
| 4,318,251 A * | 3/1982 | Winkler | 52/2.17 |
| 4,366,806 A | 1/1983 | Acker | |
| 4,389,961 A * | 6/1983 | Parish | 114/345 |
| 4,459,714 A * | 7/1984 | Lin | 5/655.3 |
| 4,467,786 A * | 8/1984 | Sorensen | 126/568 |
| 4,524,757 A * | 6/1985 | Buckley | 126/624 |
| 4,777,679 A * | 10/1988 | DeLooper | 5/655.3 |
| 4,878,258 A * | 11/1989 | Casey | 5/420 |
| 4,962,553 A * | 10/1990 | Marquis | 5/710 |
| 5,046,358 A * | 9/1991 | Wulf et al. | 73/147 |
| 5,125,355 A * | 6/1992 | Stranzinger | 114/266 |
| 5,168,589 A * | 12/1992 | Stroh et al. | 5/710 |
| 5,566,409 A * | 10/1996 | Klearman | 5/723 |
| 5,575,738 A * | 11/1996 | Millington et al. | 482/35 |
| 5,634,225 A * | 6/1997 | Miller et al. | 5/710 |
| 5,689,845 A * | 11/1997 | Sobieralski | 5/654 |
| 5,745,941 A * | 5/1998 | Miller, Sr. | 5/710 |
| 5,895,309 A * | 4/1999 | Spector | 446/220 |
| 5,991,949 A * | 11/1999 | Miller et al. | 5/710 |
| 6,322,454 B1 * | 11/2001 | Gordon | 472/134 |
| 6,701,558 B2 * | 3/2004 | VanSteenburg | 5/737 |
| 6,745,714 B1 * | 6/2004 | Faber | 114/263 |
| 6,805,066 B2 * | 10/2004 | Johnson | 114/266 |
| 6,901,619 B1 * | 6/2005 | Hsia | 5/710 |
| 7,000,558 B2 * | 2/2006 | Johnson | 114/266 |
| 7,052,344 B1 * | 5/2006 | Peterson | 441/40 |
| 7,093,593 B2 * | 8/2006 | Rosene et al. | 126/565 |
| 7,219,380 B2 * | 5/2007 | Beck et al. | 5/713 |
| 7,328,472 B2 * | 2/2008 | Chaffee | 5/706 |
| 7,357,688 B2 * | 4/2008 | Ferrara | 441/35 |
| D569,527 S | 5/2008 | Rosene | |
| 7,387,473 B2 * | 6/2008 | Smith | 405/303 |
| D579,570 S | 10/2008 | Rosene | |
| 7,874,023 B1 * | 1/2011 | Sundling | 4/499 |
| 2003/0140410 A1 * | 7/2003 | Bartlett | 4/498 |
| 2004/0058599 A1 * | 3/2004 | Johnson | 441/129 |
| 2004/0064882 A1 * | 4/2004 | Bartlett | 4/502 |
| 2005/0051073 A1 * | 3/2005 | Johnson | 114/266 |
| 2005/0097674 A1 * | 5/2005 | Mileti | 5/710 |
| 2005/0172412 A1 * | 8/2005 | Pearson | 5/659 |
| 2005/0208849 A1 * | 9/2005 | Ferrara | 441/129 |
| 2006/0005830 A1 * | 1/2006 | Rosene et al. | 126/565 |
| 2006/0236464 A1 * | 10/2006 | Beck et al. | 5/713 |

OTHER PUBLICATIONS

U.S. Appl. No. 29/308,237, Rosene.
U.S. Appl. No. 11/400,268, Rosene.
U.S. Appl. No. 29/312,549, Rosene.

* cited by examiner

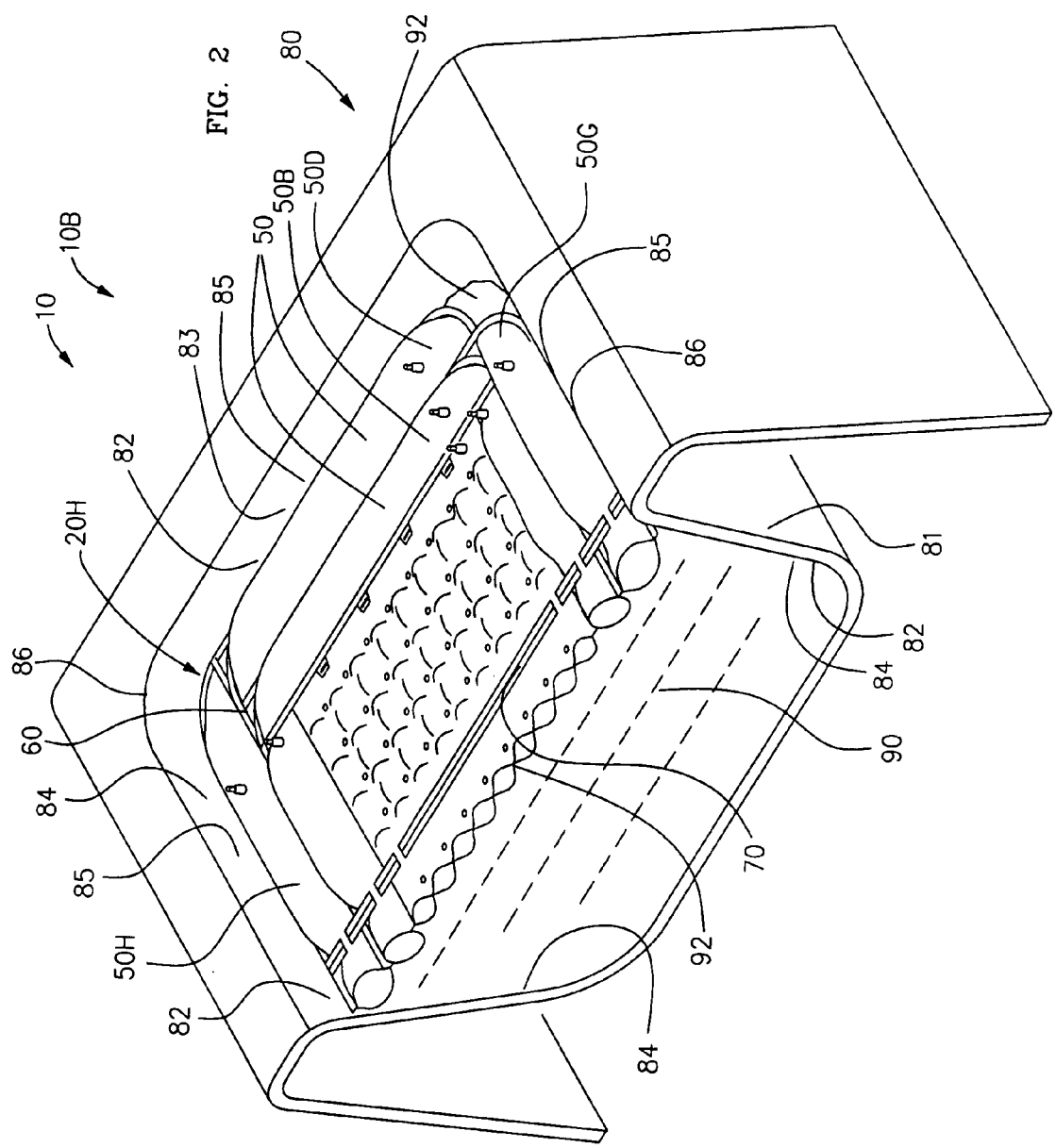

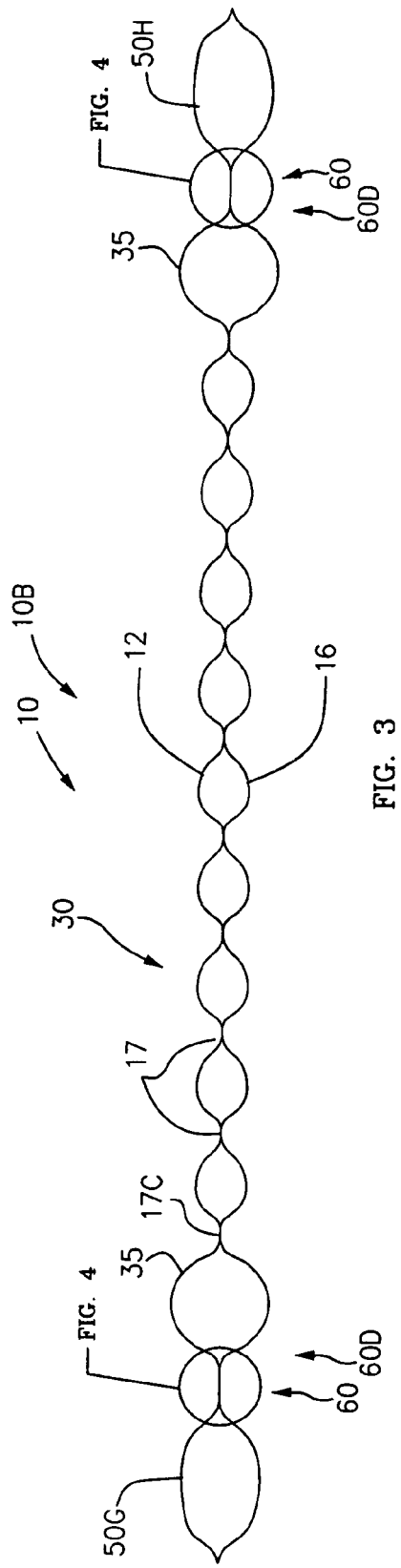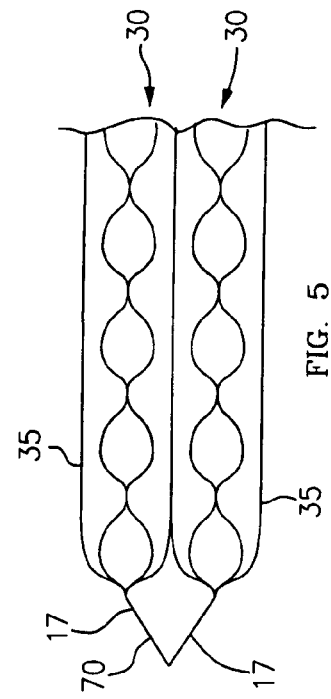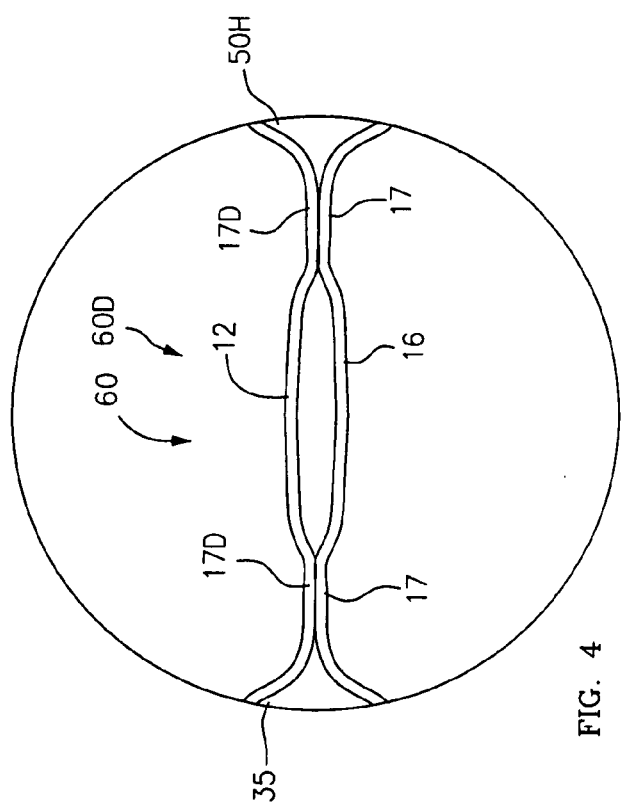

FLOATING SPA COVER OR ADJUSTABLE SIZE

CROSS-REFERENCE TO RELATED APPLICATIONS

This application is a continuation-in-part of application Ser. No. 11/400,268 filed Apr. 7, 2006 now U.S. Pat. No. 7,603,727.

FIELD OF THE INVENTION

This invention relates in general to insulating covers, and more specifically involves an inflatable, floating spa cover.

BACKGROUND OF THE INVENTION

Spa covers are used to cover and insulate the spa. The two major types of cover are the rigid cover and the floating cover. The rigid cover commonly is supported by the deck surrounding the spa. Rigid covers are typically about four to six inches thick and contain foam insulation. They are rather heavy and awkward to remove and replace and require a large storage space when off the spa.

There are two major types of conventional floating covers. Both types use a large thin sheet of material, typically about one-quarter inch thick, from which is cut a cover to fit the size of the particular spa. One type uses a sheet of closed-cell foam and the other type uses a bubble wrap sheet, such as used in packing.

Conventional floating covers of thin sheet material have several drawbacks. They often fold under water when impacted by waterjets of the spa. As a result, they do not cover the entire area and much heat is lost. Also, they must be cut to size, which requires measurement. Additionally, they do not readily provide for solar heating of the spa.

Therefore there has been a need for an improved floating spa cover that is inexpensive and readily adaptable to spas of different sizes.

It is additionally desirable that such a cover provide solar heating to the spa water.

Our above-identified, previously-filed patent describes a circular spa of variable diameter that addresses these concerns with respect to circular spas. However, circular spas vary in size only by varying the diameter, whereas rectangular spas vary in size by varying both length and width such that varying a single dimension does not solve the problem.

Particularly in rectangular spas, it is desirable to be able to fold half of the cover back on itself if only half of the spa is being used. Folding the cover back on itself saves the user from having to completely remove the cover and also saves heat energy.

Therefore, there has been a need for an improved floating spa cover that is inexpensive and readily adaptable to for rectangular spas of different sizes. It is additionally desirable that such a cover be foldable. It is additionally desirable that such a cover provide solar heating to the spa water.

SUMMARY OF THE INVENTION

The invention is an insulating cover for floating on liquid, such as in a spa. The cover has an area for covering an area of the surface of the liquid. The cover generally comprises a first rectangle for covering a first area and a plurality of successive rectangular tubes connected to either the first rectangle or to a larger rectangle formed by the addition of a prior successive tube, so as to form another rectangle for covering additional area. The amount of coverage area can be adjusted by selectively detaching tubes, such as by cutting them off, and by changing the amount of inflation of tubes. In this manner, the cover can be adapted to fit in spas of different sizes.

In an exemplary embodiment, tubes adjust both the width and length of the cover, and the cover is adapted for folding substantially in half when inflated.

Other features and many attendant advantages of the invention will become more apparent upon a reading of the following detailed description together with the drawings wherein like reference numerals refer to like parts throughout.

BRIEF DESCRIPTION OF THE DRAWINGS

FIG. 2 is a partially-cut-away perspective view of a second embodiment of the cover floating on the water of a spa.

FIG. 3 is a sectional view of the cover taken on line 3-3 of FIG. 2.

FIG. 4 is an enlarged sectional view of a double weld web of the cover.

FIG. 5 is a partially-cut away sectional view showing the cover in the folded position.

DETAILED DESCRIPTION OF THE INVENTION

Figure 1:
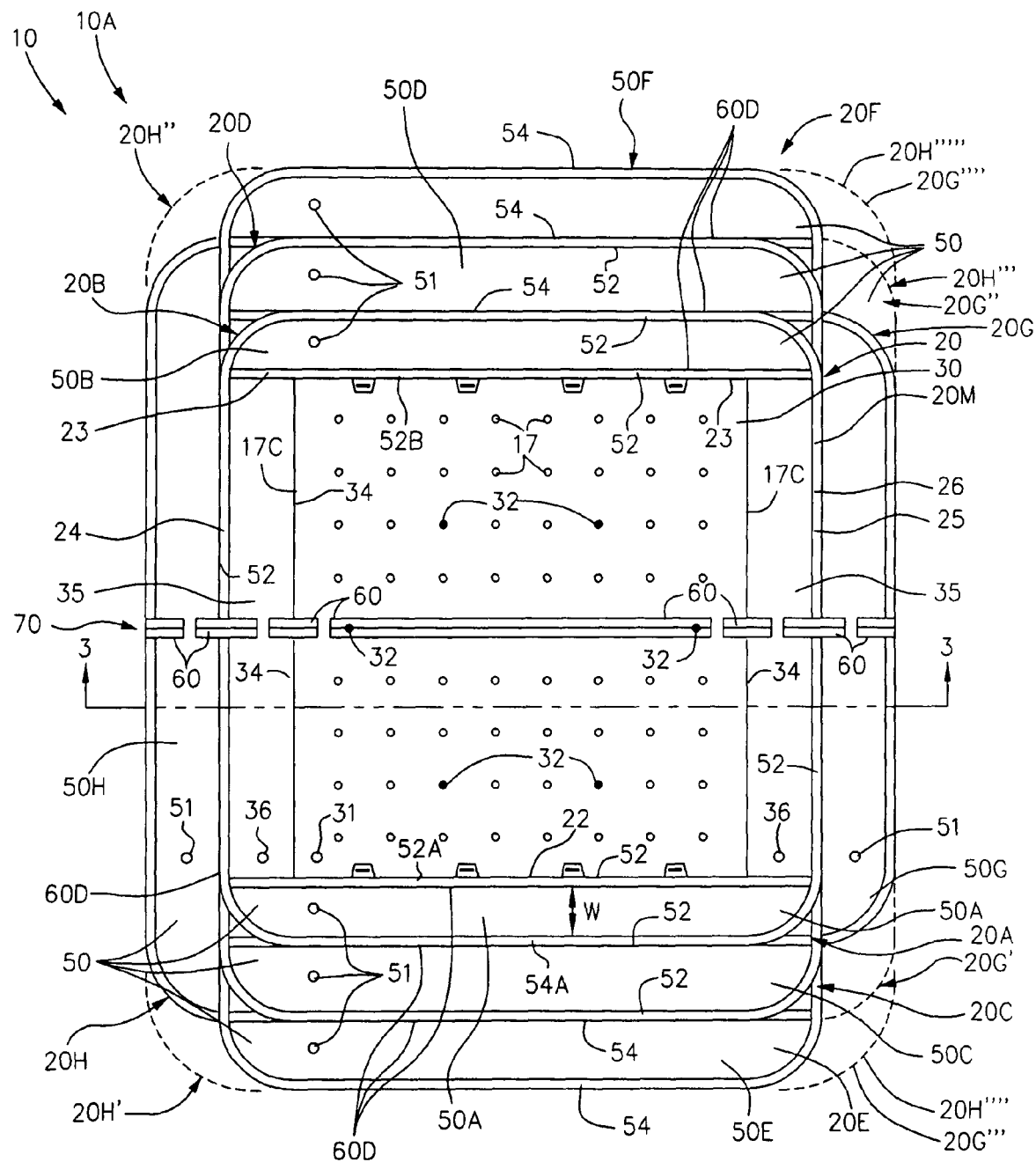
FIG. 1 is a top plan view of an exemplary embodiment of an inflatable, floating spa cover of the invention.

With reference now to the drawings, and more particularly to FIGS. 1-3 thereof, there is shown in FIG. 1, a top plan view of an exemplary first embodiment 10A of an inflatable, floating spa cover 10 of the invention; in FIG. 2, a partially-cut-away perspective view of a second embodiment 10B of the cover 10 floating on the water 90 of a spa 80, and in FIG. 3, a sectional view of cover 10B taken on line 3-3 of FIG. 1.

FIG. 2 shows a little over half of spa 80 and cover 10B. Spa 80 generally comprises a receptacle 81 that is substantially rectangular in top view and is defined by side walls 82 including a first pair of spaced, parallel walls 83 (one of which is not shown) and a second pair of spaced, parallel walls 84 for holding water 90 having a surface 92 having an area. Typically, side walls 82 have a top 86 that is above water surface 92 such that water surface 92 is surrounded by a splash wall 85. Cover 10 floats on surface 92 of water 90 and, preferably, covers all or nearly all of surface 92.

Although the cover 10 of the invention is shown and described with respect to a spa 80 having a splash wall 85, cover 10 will function on a spill-over type spa wherein the water surface 92 is at the top 86 of side wall 82 and there is no splash wall 85. Also, although a substantially rectangular spa 80 and cover 10 is shown and described, it will be seen that the teachings of the invention are applicable to spas 80 and covers 10 of other configurations, such as of non-regular geometry.

Looking primarily at FIG. 1, cover 10A can be configured into rectangles 20 of various and varying sizes 20A-20H. Cover 10A generally comprises a main or first rectangle 20M and one or more independently inflatable and removable adjustment tubes 50, including adjustment tubes 50A-50H, added thereto to form larger rectangles 20. Although only one configuration of rectangles 20 is shown in the exemplary embodiment 10A, it should be understood from the description that other configurations are possible and may be desirable. One principle of the invention is producing a spa cover 10A of one size, the maximum area of which is reducible by the user by only partially inflating one or more adjustment tubes 50 or by removing one or more adjustment tubes 50, so as to fit spas 80 of different sizes. Adjustment tubes 50 providing the largest area of coverage that can be fully inflated within side wall 81 of spa 80 are fully inflated and any other still remaining adjustment tubes 50 are partially inflated.

Cover 10 is constructed somewhat similar to an air mattress. In the exemplary embodiment, cover 10 is constructed of an upper film 12, such as of plastic, such as of eight mil thick, ultraviolet light resistant, polyvinylchloride, and a lower film 16, such as of plastic, such as of twelve mil thick, ultraviolet light resistant polyvinylchloride. Films 12, 16 are bonded to one another at bonds 17 to form the major structural components, that is, first rectangle 20M and adjustment tubes 50. Preferably, upper film 12 is substantially transparent so as to let sunlight through. Preferably, lower film 16 is translucent such it absorbs some of the light received from upper film 12 and transmits some of the light for directly heating the water. A lower film 16 of blue tint has been found to provide the best heating of the water. The blue film is warmed by sunlight and transmits blue light into the water for heating the water. Upper film 12 and lower film 16 are substantially separated by a gas-filled space, filled such as with air.

First rectangle 20M is buoyant and provides insulation for water 90 and solar heating of water 90. First rectangle 21 has a periphery 26 surrounding an area for covering a first portion of the area of surface 92 of water 90. First rectangle 20M has a first side 22 and a second side 23 opposite first side 22 and separated therefrom in a first direction and a third side 24 and a fourth side 25 opposite third side 24 and separated therefrom in a second direction.

In exemplary embodiment 10A, first rectangle 20M includes a center section 30 and a pair of stiffener tubes 35. Center section 30 is of relatively large area, typically constituting far more than half of the area of first rectangle 20M. In the large center section 30, means, such as a plurality of bonds 17, such as ultrasonic or heat and pressure bonds, periodically bond upper film 12 to lower film 16 such that the air space between them is limited in thickness, preferably to about three-quarters of an inch to one inch. Preferably, center section 30 is bonded about its periphery 34 so as to be air tight and is inflatable such as by means of air valve 31. Center section 30 includes passages 32 therethrough to allow air to escape up from beneath cover 10A and to allow for water to drain down through from atop cover 10A. Center section 30 provides the majority of the solar heating to water 90.

One or more stiffener tubes 35 are attached to periphery 34 of center section 30. In the exemplary embodiment, stiffener tubes 35 are connected to opposite sides of periphery 34. Preferably, each stiffener tube 35 is independently inflatable, such as by air valves 36. In the construction, shown, a narrow sealing bond 17C separates the air space of stiffener tubes 35 from the gas filled space of center section 30. Stiffener tubes 35 add some stiffness to first rectangle 20M and help prevent first rectangle 20M from being swamped or folded under water surface 92 by a water jet of spa 80 and make first rectangle 20M easier to handle and manipulate. Stiffener tubes 35 could be attached to the other two sides of center section 30.

A plurality of successive adjustment tubes 50 are attached to first rectangle 20M. Each adjustment tube 50 is rectangular in top view defining an area for covering a portion of the water surface 92. Each adjustment tube 50 includes an inner side 52 and an outer side 54. The distance between inner side 52 and outer side 54 defines the width W of adjustment tube 50. Each adjustment tube 50 includes a first end and a second end, the distance between first end and second end defining the length of tube 50. Each inner side 52 is connected either to the first rectangle 20M or to a larger rectangle 20 formed by the addition of a prior successive tube 50 so as to form another rectangle 20. Each adjustment tube 50 is selectively inflatable, such as by an air valve 51, independently of first rectangle 20M and each other adjustment tube 50. Width W of adjustment tubes 50 depend inversely on the degree of inflation such that the area of said cover is selectively adjustable through a range of water covering areas by adjusting the amount of inflation of adjustment tubes 50.

For example, inner side 52A of first adjustment tube 50A is connected to first side 22 of first rectangle 20M so as to form a second rectangle 20A therewith in top view, the second rectangle having a first side, a second side, a third side, and a fourth side. Preferably, the area of first adjustment tube 50A is less than twenty percent of area of area of first rectangle 20M.

Inner side 52B of second adjustment tube 50B is connected to the second rectangle 20A, such as to first side of second rectangle 20A opposite first adjustment tube 50A so as to form a third rectangle 20B therewith in top view. Second adjustment tube 50B has a length corresponding to the side of second rectangle 20A to which it is attached. Preferably, the area of second tube 50B is less than twenty percent of the area of second rectangle 20A.

Successive adjustment tubes 50C-50F are attached in a similar manner in the first direction to form larger rectangles 20C-20F.

Adjustment tube 50G is attached to rectangle 20B in the second direction to form rectangle 20G. Alternatively, tube 50G could be attached to rectangle 20C to substantially form larger rectangle 20G', attached to rectangle 20D to substantially form larger rectangle 20G", attached to rectangle 20E to substantially form larger rectangle 20G''', or attached to rectangle 20F to substantially form larger rectangle 20G''''. The descriptor "substantially" is used to denote that the corner area of the rectangle formed is not completely filled in.

Successive adjustment tube 50H is attached to rectangle 20D in the second direction to form rectangle 20H. Alternatively, tube 50H could be attached to rectangle 20E to substantially form larger rectangle 20H', attached to rectangle 20F to substantially form rectangle 20H", attached to rectangle 20G" to substantially form rectangle 20H''', attached to rectangle 20G''' to substantially form rectangle 20H'''' or attached to rectangle 200'''' to substantially form rectangle 20H''''' which includes all of the tubes 50 shown.

Although, in the exemplary embodiment, the length of tubes 50G and 50H are shown to be the length of rectangle 20D in the first direction, it should be understood that the lengths could conform to the length of one of the smaller or larger rectangles 20

Looking again at FIGS. 2 and 3, cover 10B is cover 10A trimmed to fit within side wall 81 by removing tubes 50E and 50F to form rectangle 20H. Tubes 50G and 50H are only partially inflated to make them wider so as to just fit within first pair 82 of side wall 81.

FIG. 4 is an enlarged view of area 4 of FIG. 3 showing a web 60 of cover 10 and specifically a double weld web 60D. Each adjustment tube 50 is connected to the preceding rectangle so as to be easily selectively removable therefrom. Preferably a wide web 60 is used for attachment. Upper film 12 may be bonded to lower film 16 over the whole width of web 60 or, preferably, as double bonds 17D, that is a bonds 17 along each outer side of web 60 leaving a loose and unattached section of upper film 12 and lower film 16 between bonds 17D. The unattached section between bonds 17D is easily cut with a blade or scissors. If the wide web 60 is bonded over its entire width it tends to be stiff and is not as easily cut.

FIG. 5 is a partially-cut away sectional view showing cover 10 in the folded position. Cover 10 includes a center hinge 70 for folding cover 10 substantially in half when cover 10 is inflated. This allows a user to use half of spa 80 while the other half remains covered or provides for a more compact cover 10 for removal and storage while spa 80 is in use.

Center hinge 70 is a wide web 60 across cover 10 from side to side at or near the midsection and may include a series of webs 60 separated to provide a small passage for inflation air to pass to the other half of an enclosure. Center hinge 70 may be bonded over its entire area or may include double bonds 17D or more separated bonds as desired.

Having described the invention, it can be seen that it provides for a very efficient spa cover that is adaptable for rectangular spas of various sizes.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention

We claim:

1. A size-adjustable and rectangular floating solar pool heater, comprising:
    an upper film; and
    a lower film attached to the upper film along a plurality of locations;
    wherein the upper and lower film comprise a rectangular-shaped central cavity independently inflatable for holding a gas, wherein the central cavity defines a rectangular perimeter comprising a first side, a second side opposite the first side, a third side, and a fourth side opposite the third side;
    wherein the upper and lower film further comprise a plurality of linear tube sections each independently inflatable for holding a gas or fluid therein, wherein the plurality of linear tube sections are integrally formed about the rectangular perimeter attached to the first, second, third or fourth sides; the width of said tubes depending inversely on the degree of inflation such that the area of said heater is selectively adjustable through a range of water covering areas by adjusting the amount of inflation of said tubes.

2. The solar pool heater of claim 1, wherein the upper film and lower film comprise a center hinge defining a first half and a second half oppositely disposed about the center hinge, wherein the first half or second half is pivotable about the center hinge in relation to the other half.

3. The solar pool heater of claim 1, including a plurality of spot welds disposed along the central cavity connecting the upper and lower films.

4. The solar pool heater of claim 1, wherein the upper film comprises a transparent film, and wherein the lower film comprises a translucent film.

5. An insulating cover for floating on a surface of a water source; said insulating cover having an area for covering an area of the surface of the water source; said insulating cover comprising:
    a first rectangle having an area for covering a first portion of the area of the surface of the water source; said first rectangle having:
        a first side;
        a second side opposite said first side;
        a third side; and
        a fourth side opposite said third side;
    wherein the first rectangle comprises an upper film attached to a lower film forming an inflatable central cavity;
    a plurality of successive tubes; each said successive tube being independently inflatable; each said successive tube being rectangular in top view and having an area; each successive tube including: an inner side connected to either the first rectangle or to a larger rectangle formed by the connection of a prior successive tube so as to form another rectangle; each said tube being selectively inflatable independently of said first rectangle and each other; the width of said tubes depending inversely on the degree of inflation such that the area of said cover is selectively adjustable through a range of water covering areas by adjusting the amount of inflation of said tubes.

6. The spa cover of claim 5 wherein: each said successive tube is connected to the preceding rectangle with a horizontal web adapted for cutting such that the successive tube is selectively removable therefrom by cutting said web.

7. The cover of claim 5 wherein: at lease one successive tube is at right angles to another successive tube.

8. The cover of claim 5 wherein: said cover is adapted for folding substantially in half when inflated.

9. An insulating cover for a spa comprising:
    a first rectangle having an area for covering a first portion of a water surface; said first rectangle having:
        a first side having a length;
        a second side opposite said first side;
        a third side having a length; and
        a fourth side opposite said third side;
    wherein the first rectangle comprises an upper film attached to a lower film forming an inflatable central cavity;
    a first tube having an area for covering a second portion of the water surface; said first tube being rectangular in top view and having a length and a width; said first tube including:
        an inner side having a length substantially equal to the length of said first side of said first rectangle
        an outer side; the distance between said inner side of said first tube and said outer side of said first tube defining the width of said first tube; a first end; and
        a second end; said inner side of said first tube connected to said first side so as to form a second rectangle therewith in top view; the second rectangle having a first side, a second side, a third side, and a fourth side; and
    a second tube having an area for covering a third portion of the water surface; said second tube being rectangular in top view and having a length and a width; said second tube including:
        an inner side having a length substantially equal to the first side of the second rectangle;
        an outer side; the distance between said inner side of said second tube and said outer side of said second tube defining the width of said second tube;
        a first end; and
        a second end; said inner side of said second tube connected to said first side of the second rectangle so as to form a third rectangle therewith in top view; said tubes being selectively inflatable independently of said first rectangle and each other; the width of said tubes depending inversely on the degree of inflation such that the area of said cover is selectively adjustable through a range of water covering areas by adjusting the amount of inflation of said tubes.

10. The spa cover of claim 9 wherein: said second tube is connected to the second rectangle so as to be easily selectively removable therefrom.

11. The spa cover of claim 9 wherein: said second tube is connected to the second rectangle with a horizontal web adapted for cutting such that said second tube is selectively removable therefrom by cutting said web.

12. The spa cover of claim 9 wherein: the area of said first tube is less than twenty percent of the area of the first rectangle.

13. The spa cover of claim 9 wherein: the area of said second tube is less than twenty percent of the area of the second rectangle.

14. The spa cover of claim 13 wherein: the area of said first tube is less than twenty percent of the area of the first rectangle.

15. The spa cover of claim 9 wherein: said second tube is at right angles to said first tube.

16. The spa cover of claim 9 wherein: said cover is adapted for folding substantially in half when inflated.

17. An insulating cover for floating on liquid having a surface having an area, said insulating cover having an area for covering an area of the surface of the water, said insulating cover comprising:
 a first rectangle having an area for covering a first portion of the area of the surface of the water; said first rectangle having:
  a first side;
  a second side opposite said first side;
  a third side; and
  a fourth side opposite said third side;
 a plurality of successive tubes; each said successive tube being rectangular in top view and having an area; each successive tube including:
  an inner side connected to either the first rectangle or to a larger rectangle formed by the addition of a prior successive tube so as to form another rectangle; each said tube being selectively inflatable independently of said first rectangle and each other; the width of said tubes depending inversely on the degree of inflation such that the area of said cover is selectively adjustable through a range of water covering areas by adjusting the amount of inflation of said tubes;
 wherein the first rectangle and the plurality of successive tubes are both integrally formed by an upper film attached to a lower film.

18. The cover of claim 17 wherein: each said successive tube is connected to the preceding rectangle so as to be easily selectively removable therefrom.

19. The cover of claim 17 wherein: each said successive tube is connected to the preceding rectangle with a horizontal web adapted for cutting such that the successive tube is selectively removable therefrom by cutting said web.

20. The cover of claim 17 wherein: at least one successive tube is at right angles to another successive tube.

21. The cover of claim 17 wherein: said cover is adapted for folding substantially in half when inflated.

22. The spa cover of claim 17 wherein: said first rectangle is inflatable.

* * * * *